INVENTOR.
Harold A. Rowley

Dec. 28, 1965          H. A. ROWLEY                3,225,721
              DUMPING REFRACTORY HEARTH FURNACE
Filed Jan. 4, 1962                           4 Sheets-Sheet 2
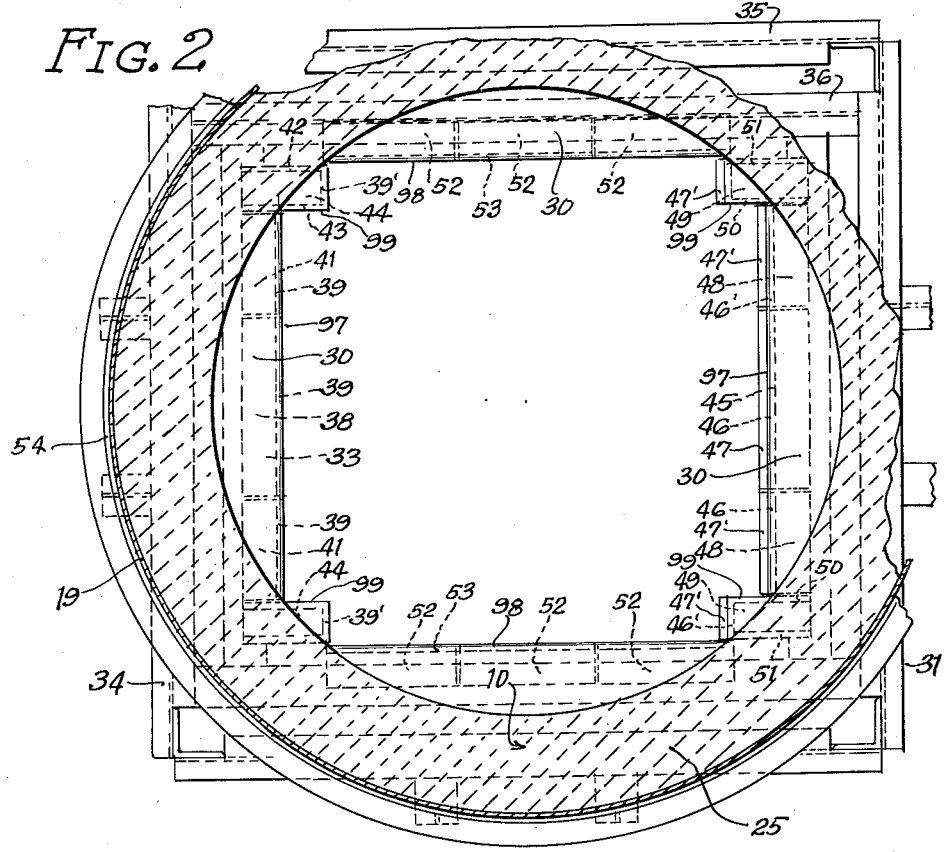
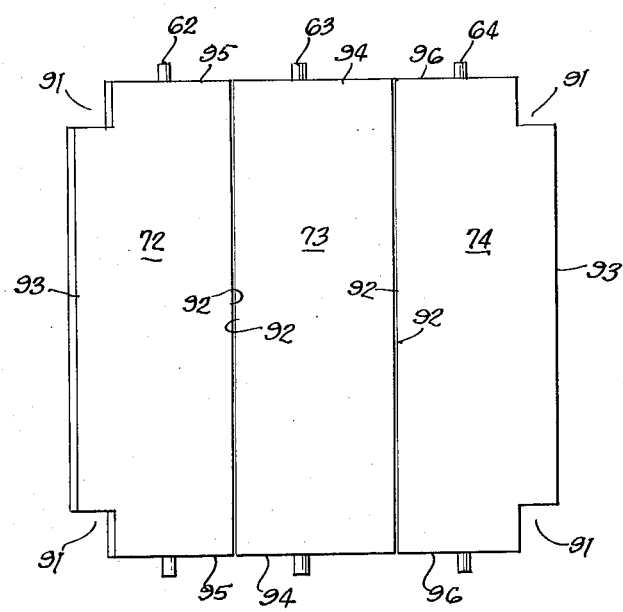
INVENTOR.
Harold A. Rowley
BY Zabel, Baker, York,
Jones and Dithmar
Att'ys Dec. 28, 1965  H. A. ROWLEY  3,225,721
DUMPING REFRACTORY HEARTH FURNACE
Filed Jan. 4, 1962  4 Sheets-Sheet 3
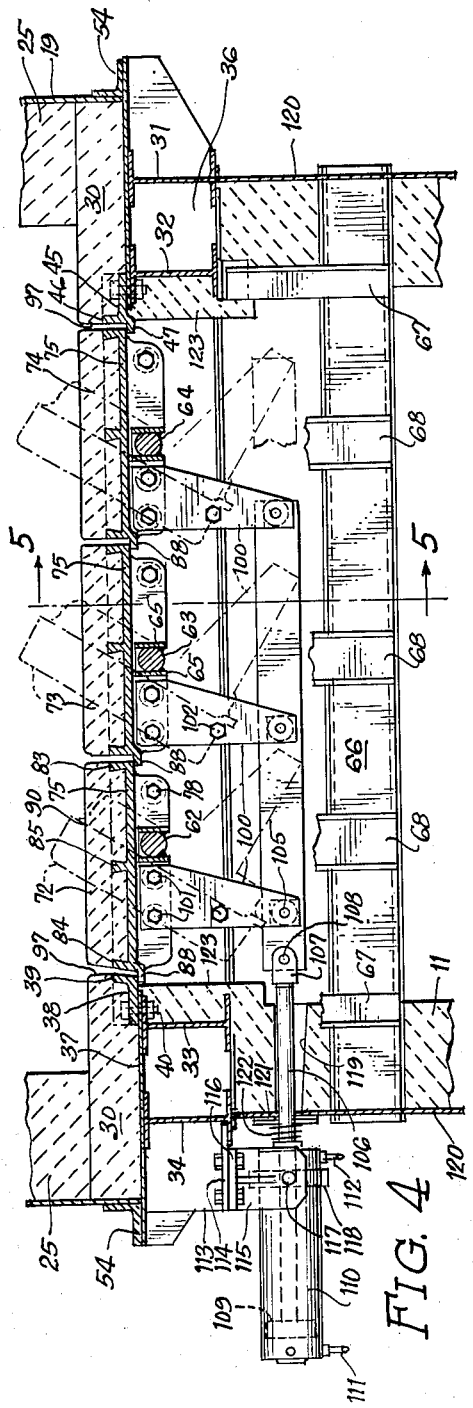
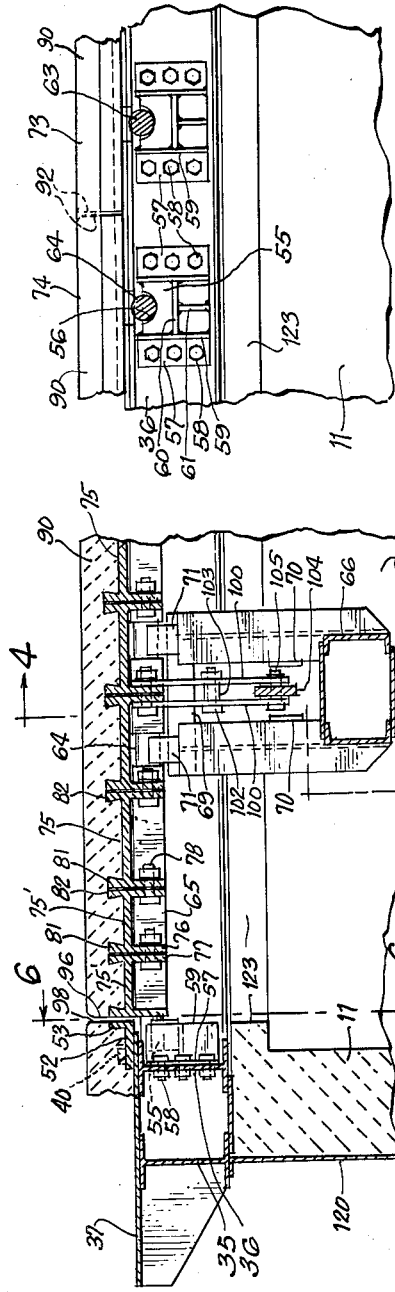
INVENTOR.
Harold A. Rowley
BY Zabel, Baker, York,
Jones and Dithmar
Att'ys INVENTOR.
Harold A. Rowley

United States Patent Office 3,225,721
Patented Dec. 28, 1965

3,225,721
DUMPING REFRACTORY HEARTH FURNACE
Harold A. Rowley, Palos Heights, Ill., assignor to M. H. Detrick Company, Chicago, Ill., a corporation of Delaware
Filed Jan. 4, 1962, Ser. No. 164,286
4 Claims. (Cl. 110—7)

My invention relates to furnaces and more particularly to a dumping refractory hearth furnace.

My invention is particularly adapted for the burning of refuse fuels, such as bagassee, wood refuse, wood bark, cotton seed hulls and other moist fuels. Such fuels are almost always contaminated with foreign matter, the presence of which is usually attributable to either the method of harvesting the product from which the fuel material is obtained, the transport thereof or the manufacturing operations involved in the production of this material, which would otherwise be a waste product. The contamination usually consists of salt, shells, silt or sand, or a combination of these contaminating materials.

While such fuels are relatively low in ash as compared with coal, the combination of the contaminants with the ash forms a cementitious slag at low fusion temperatures.

The use of grates, in a furnace that is adapted for burning such refuse fuels, is objectionable, because the formation of such a slag, interferes with the cooling of the grate bars, such cooling being normally obtained when the grates are free of slag, by passage of air through the grates. As, in furnaces of this character, the primary combustion air is passed upwardly through the grate and the fuel bed, any interruption of this flow would cause damage to the grates by overheating. Such overheating occurs locally on the grate because of formation of slag at certain locations thereon. This results in overheating and deformation and ultimate destruction of the grate. To aid in the combustion of such refuse fuels, the heating of the primary air to from 400° to 450° Fahrenheit is often practiced. This aggravates the cooling problem further and has made it necessary to use water cooled grates. This further makes it necessary to have a continuous supply of cooling water to chill the slag and to prevent overheating of the grate. Where such water cooled grates are used any interruption of flow of water will cause the grate to be damaged. Furthermore heating of such grates is often caused to develop to an undesirable extent, due to reduction or interruption of the flow of cooling water through such grates, due to liming up of grate tubing due to use of untreated water.

In order to avoid these difficulties, it has been proposed to use a solid refractory hearth for supporting the fuel in the furnace. In the burning of such waste fuels on such a solid refractory hearth, all the primary combustion air is admitted over the fuel bed, which is ordinarily in the shape of a conical pile or fuel cone. In such a structure, a bed of ash starts to accumulate on the hearth almost immediately after ignition, which acts as an insulator protecting the refractory hearth. One of the serious problems, involved in the use of such a hearth, has been the ash removal which, prior to the present invention, had to be accomplished manually through ash removal doors, which would temporarily put the furnace out of operation, if a single fuel burning chamber or cell were provided, and cause interruption in operation of the furnace, which is undesirable.

In order to avoid interruption of operation of the furnace, in the burning of such waste fuels on a solid refractory hearth, such refractory hearth furnaces have been provided with a plurality of fuel burning cells, which have made it possible to remove the ashes from one cell at a time, keeping the other cells in operation while the particular cell that is being cleaned of ashes, is being cleaned out. While such multi-cell furnace structures, avoid complete interruption of the operation of the furnace, the opening of the ash removal door of the cell, reduces the efficiency of the furnace considreably, because while the ashes are being removed from that cell considerable cold air is entering the furnace and will travel to the combustion chamber, to mingle with the hot products of combustion, reducing the heating effect thereof. Also while the particular cell that is being cleaned is open to the outer air, the brickwork therein cools. As the radiant heat from this brickwork is relied on to ignite a new charge that is to be introduced into the cell, if the brickwork of the cell cools to too great an extent, it will not ignite the fuel or it will not ignite the fuel as rapidly as is desired.

It is a purpose of my invention to avoid the difficulties encountered in connection with the removal of ash from a refuse fuel furnace having a solid hearth as well as those encountered in connection with such a furnace having a grate, in the use thereof for burning waste or refuse fuel. I accomplish this purpose by providing a furnace with a dumping hearth, avoiding all of the difficulties encountered with the feeding of primary air to a grate and the difficulties encountered in connection with the removal of the ash from a fixed solid hearth. As my improved furnace structure that utilizes the dumping hearth, reduces the time required to remove the ash from the hearth very materially, my dumping hearth permits faster ignition of the new fuel charge that is to be introduced into the cell or other combustion space provided with my dumping hearth. This is because the cell brickwork does not have the opportunity to cool, as the ash pit which is located below the combustion chamber and below the dumping hearth, which forms the bottom of the combustion chamber, is kept closed against the entrance of air except for the brief period of time when the ashes are removed from the ash pit. As the ashes do not have to be removed from the ash pit during the dumping operation, there will be no chance for cool air to pass upwardly through the hearth and into the combustion chamber during this ash dumping operation. There is accordingly ample radiant heat available to ignite the new charge of fuel.

More specifically it is a purpose of my invention to provide a combustion chamber with an ash pit extending under the major portion thereof, and a refractory dumping hearth that is located between the combustion chamber and the ash pit, forming the bottom of the combustion chamber and the top wall of the ash pit, the hearth being movable between a fuel supporting position and a dumping position, and forming a closed wall between the combustion chamber and the ash pit when it is in fuel supporting position.

My improved dumping hearth is made up of a plurality of sections, each of which is pivotally mounted for swinging movement between a fuel supporting and a dumping position and the operating means therefor comprises means for simultaneously moving the sections between the two positions. Still more specifically, my invention has for its purpose the provision of such a dumping hearth made up of sections that are mounted to swing or pivot about parallel axes, each of which sections is made up of a metal body portion and a refractory body mounted on said metallic body portion so as to form the upper or top fuel supporting surface thereof when the hearth is in fuel supporting position.

It is a further purpose of my invention to provide operating means for moving the sections of the dumping hearth between a fuel supporting position and a dumping position, comprising a cylinder supplied with operating fluid under pressure, which is provided with the usual piston operating therein, that is connected by means of a piston rod with an operating member in the form of a bar, that is pivotally connected with lever arms, that are rigidly secured to the metal body portions of the sections of the dumping hearth in spaced relation to the pivotal axes thereof. In order to make it unnecessary to keep the cylinder supplied constantly with operating fluid under pressure to hold the hearth in its horizontal fuel supporting position, a plurality of said sections are mounted with their pivotal axis off the center line thereof in the same direction, so as to overbalance the assembly in such a direction that the hearth will have a normal tendency to move toward and be held in horizontal fuel supporting position.

It is another purpose of my invention to provide sections for a dumping hearth of the above referred to character, that are provided with a top surface covering or facing of refractory material, which is preferably made of a castable refractory or rammed refractory, and which sections are provided with means for interlocking the refractory material with the metallic body portion of the sections, comprising flanges that are undercut to interlock the refractory material with the metal body portion. Said refractory material is so arranged with respect to the body portion as to be interposed between all of the metal parts of said body portion and the burning fuel mounted on the hearth.

Other objects and advantages of my invention will appear as the description of the drawings proceeds. I desire to have it distinctly understood, however, that I do not intend to limit myself to the particular details shown or described except as defined in the claims.

In the drawings:

FIG. 2 is a section partly broken away, taken on the line 2—2 of FIG. 1 on an enlarged scale, the dumping hearth and operating means therefor being omitted.

FIG. 3 is a plan view of the dumping hearth detached.

FIG. 4 is a vertical sectional view through my improved dumping refractory hearth and fragmentary portions of the combustion chamber and ash pit in elevation, the section being taken substantially on the line 4—4 of FIG. 5.

FIG. 5 is a fragmentary sectional view taken at right angles to FIG. 4 on the line 5—5 of FIG. 4.

FIG. 6 is a fragmentary sectional view taken on the line 6—6 of FIG. 5.

Figure 1:
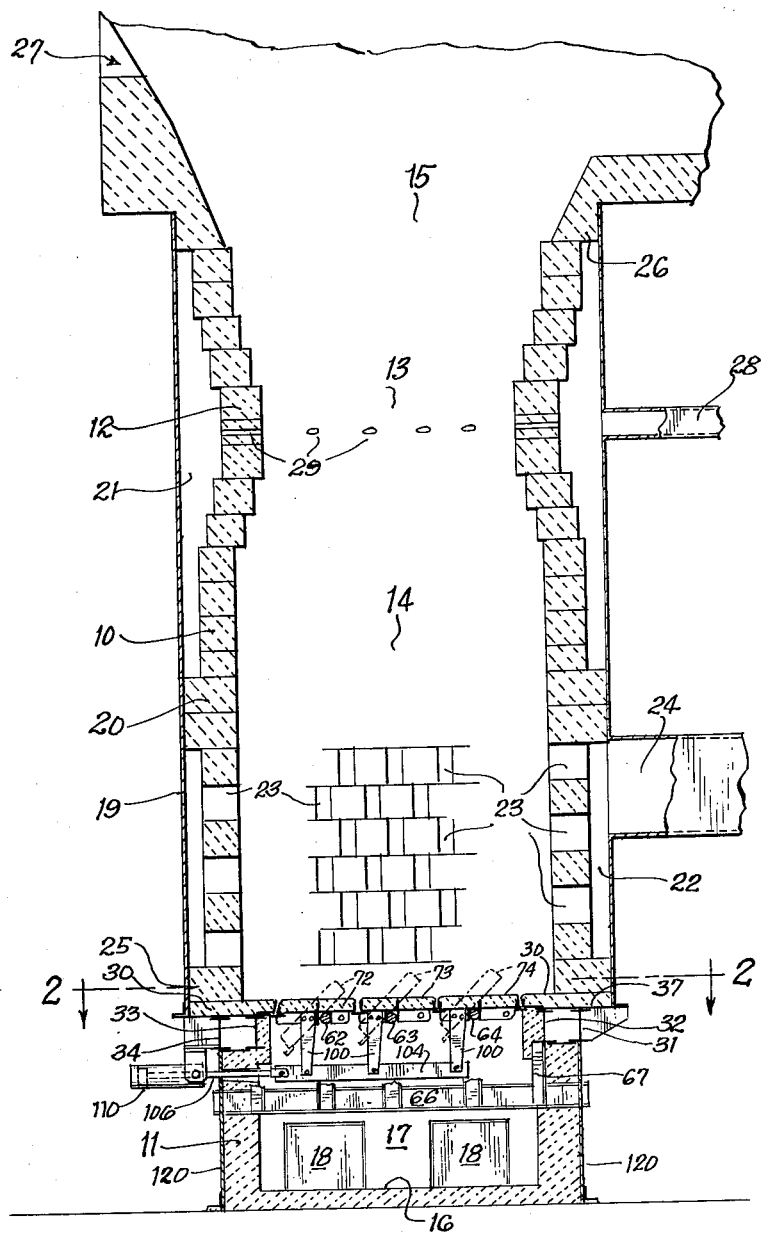
FIG. 1 is a vertical sectional view through a portion of a furnace, partly broken away, embodying my invention.

Referring in detail to the drawings, in FIG. 1 is shown a portion of a furnace, which is provided with refractory walls 10 and 11, the wall 10 being shown as being made up of separate refractory members or tiles, and the walls 11 being shown as being made of a monolithic refractory material. The wall 10 is provided with offset portions 12 that are directed toward each other to provide a reduced throat portion 13 in the combustion chamber, between the lower portion 14 thereof and the upper portion 15 thereof. The walls 11 are the vertical walls of an ash pit that has a bottom wall 16, the ash pit being designated by the numeral 17, one of the walls 11 being provided with ash clean-out doors 18, which are adapted to prevent flow of air into the ash pit 17 when the doors 18 are closed. It will be noted that the ash pit is of substantially the same cross sectional area as the lower portion 14 of the combustion chamber, and thus underlies the major portion of the combustion chamber.

A metallic housing 19 is provided in spaced relation to the wall 10, and a refractory partition 20 is provided, dividing the resulting space between the metallic housing 19 and the refractory wall 10 into an upper chamber 21 and a lower chamber 22. Primary air is supplied to the combustion chamber in the lower portion 14 thereof through the openings 23 leading from the chamber 22, which has an air supply duct 24 connected therewith. The openings 23 are located in the vertical wall 10, in an area extending from near the bottom of said wall to a point that is about horizontally aligned with the top of the usual conical fuel pile provided on the hearth, to be described below. The bottom of chamber 22 is closed by means of a refractory ring 25, and the upper end of the chamber 21 is closed by means of the refractory wall 26 provided at the upper end of the combustion chamber portion 15. Fuel is supplied to the combustion chamber through the fuel inlet passage 27.

An air supply conduit 28 leads to the chamber 21, through which air is supplied under pressure to said chamber 21. Openings 29 are provided in the offset wall portion 12 at the throat portion 13, which communicate with the combustion chamber and with the chamber 21, and extend substantially at a tangent to the wall portion 12 of the combustion chamber. The purpose of supplying the air to the throat portion in the above referred to manner is to create a whirling action in the upwardly flowing hot gases, encountered by the fuel introduced through the opening 27, to bring about the combustion of at least some of the fuel in a finely divided state as it is traveling downwardly from the opening 27 toward the pile of fuel that is on the hearth. The combustion chamber is thus of the general character of those shown in the patents to Dennis, 2,602,409, patented July 8, 1952, and 2,754,778, patented July 17, 1956.

At the bottom of the wall 10 is a monolithic refractory member 30. Horizontal frame members 31, 32, 33 and 34 running in one direction and similar frame members extending transversely to the members 31, 32, 33 and 34, of which the members 35 and 36 are shown in FIG. 5, underlie the wall 10, a metallic plate-like member 37 being positioned on the frame members and the monolithic refractory material 30 being positioned on top of the plate-like member 37. Mounted on the plate-like member 37 is an angular in cross section bar 38 that has the upstanding flange 39 that inclines slightly inwardly, as will be obvious from FIG. 4. Said bar 38 is secured to a flange of the frame member 33 by securing elements 40, which also extend through the plate 37 to secure it in position on the frame members. L-shaped bars 41 of similar cross section to bar 38 are provided on opposite ends of the bar 38, said bars 41 having the inclined flanges 39' and being provided with the flanges 42 and 43, which extend perpendicularly to the flanges 39' on the short legs 44 of said bars 41, all said bars being firmly secured to the frame member 33 and the plate 37 in the manner above described.

Opposite the bar 38 is a bar 45, which is mounted, in the same manner as the bar 38 on a flange of the frame member 32. Said bar 45 extends parallel to the bar 38 and has a right angularly extending upstanding flange 46 thereon and a downwardly offset horizontal ledge 47 thereon. L-shaped bars 48 of a similar cross section to the bar 45 are provided at opposite ends of the bar 45, said L-shaped bars having ledges 47' thereon aligning with the ledge 47 of the bar 45 and ledges 47' thereon, similar to the ledge 47, on the projecting ends of the short legs 49, which are provided with upstanding flanges 50 and 51 that extend perpendicularly to the flanges 46 on the bars 48, which are in alignment with the flange 46 on the bar 45 and the inner ends of the short legs 49, L-shaped bars 48 being provided with upstanding flanges 46' that are of the same character as the flanges 46.

Extending perpendicularly to the bars 39 and 35 adjacent the short legs 44 and 49 of the bars 41 and 48 are two opposed rows of bars 52, said bars 52 being longitudinally aligned and being each provided with an upstanding marginal flange 53, and being secured to a flange of a horizontal frame member, such as the frame member 36, by suitable fastening elements 40, said fastening elements 40 also securing the plates 37 in position on said horizontal frame members. The monolithic refractory material 30 is thus confined between the metal wall 19, and the bottom plate 37 and the various bars 38, 41, 45, 48 and 52. Preferably a ring-like angle member 54 is provided for securing the upstanding wall 19 to the bottom plate 37.

Mounted on the frame member 36, and a corresponding frame member on the opposite side of the structure, are bearing members 55, said bearing members having bearing recesses 56 therein and being provided with flanges 57 that are bolted to a frame member, such as the frame member 36, upon which the same are mounted, the bolts being indicated at 58. Said bearing members are further provided with reinforcing ribs 59, 60 and 61. One of said bearing members 55 is mounted midway between the bars 45 and 38 and thus midway across the opening in the refractory member 30. In the structure shown, three such bearing members are provided.

Shafts are mounted for rotation in said bearing members, the shafts being indicated by the numerals 62, 63 and 64. Each of said shafts is provided with pairs of parallel flat bars 65, which are secured to the shafts 62, 63 and 64 rigidly in position, as by welding. In the structure shown in the drawings the shafts 62, 63 and 64 have a longitudinally spaced pair of flat bars 65 on each side therefrom, said bars terminating short of the ends of said shafts and being spaced apart at the mid-portions of each of said shafts. The spacing of the bearing members is such that the shafts 63 and 64 will be located eccentrically of the hearth sections mounted thereon, in one direction while the shaft 62 will be located eccentrically of the hearth section mounted thereon in the opposite direction. The purpose of this arrangement of the bearing members will be explained below.

Bearing means is provided for the mid-portions of the shafts 62, 63 and 64, said bearing members being supported on a box frame member 66, which box frame member has its ends embedded in the walls 11, and is connected with the horizontal frame members 32 and 33 by means of angle members 67. Secured in fixed position on the box frame member 66 are pairs of upwardly extending bracket members 68 H-shaped in cross section, that are connected by means of a transverse frame member 69 and bracing means 70. Bearings 71 are mounted on the transverse member 69 supporting the mid-portions of the shafts 62, 63 and 64 in a similar manner to that in which they are supported by the bearing members 55.

Figure 7:
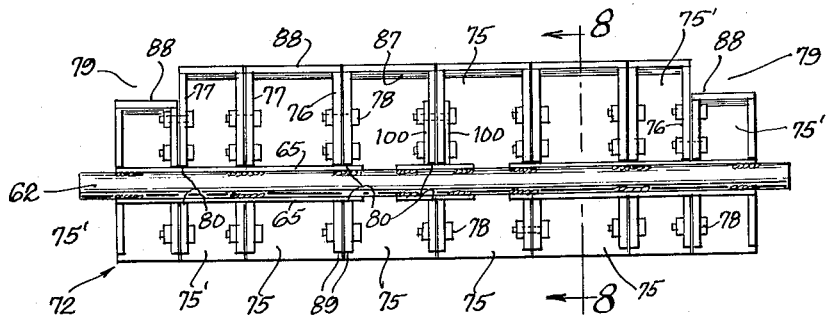
FIG. 7 is a bottom plan view of one of the hearth sections and the shafts pivotally mounting the same.
Figure 8:
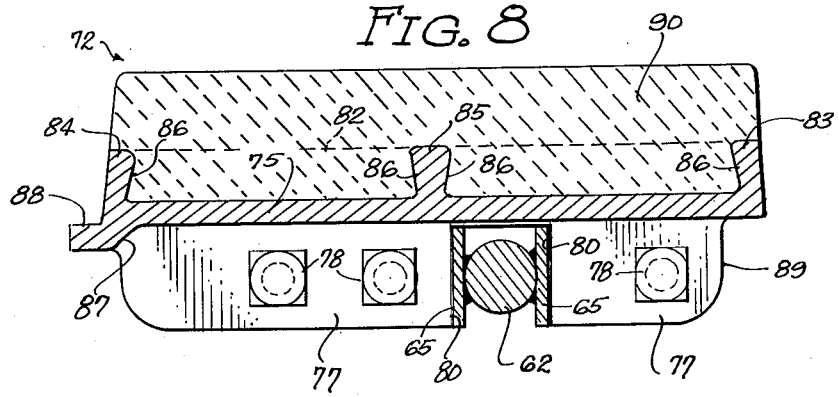
FIG. 8 is a transverse sectional view through one of said sections of the hearth, on an enlarged scale, taken on the line 8—8 of FIG. 7.

The dumping refractory hearth is shown as being made of three hearth sections 72, 73 and 74 mounted, respectively, on the shafts 62, 63 and 64. Each of said hearth sections is made up of a plurality of flanged plates. One of said hearth sections, the hearth section 72, is shown in FIGS. 7 and 8 and comprises a plurality of flanged plates 75 and 75', the plates 75' being of a similar character to the plates 75, but being somewhat narrower than the plates 75. Each of the plates 75 and 75' is provided with pairs of aligned longitudinally extending flanges 76 and 77, the flanges 77 of one of said plate-like members being secured to the flanges 76 of the next adjacent plate-like member by means of fastening elements, such as the bolts 78, to form the metal body portion of the hearth section. The hearth section shown in FIG. 7 has cut out corner portions at the opposite ends of one longitudinal edge thereof, the flanged plates 75' at the ends of said section being cut back so as to form the corner recesses 79, as indicated in FIG. 7.

Upon reference to FIGS. 4, 5, 7 and 8 it will be seen that the flanges 76 and 77 have right angular end edges or end walls 80 that are spaced such a distance apart that the plate-like members 65 will readily fit in between said end edges 80 of said flanges 77 or 76, as the case may be. Thus the metallic body portions of the sections 72, 73 and 74, made up of the metallic flanged plate-like members 75 and 75', will be mounted on the shafts 62, 63 and 64 so as to swing about the axes of said shafts as they turn in the bearings 55 and 71.

Transverse undercut upstanding marginal flanges 81 and 82 are provided on each of the plate-like members 75 and 75', which are located opposite the depending flanges 76 and 77. Each of said flanged plate-like members 75 and 75' is further provided with an upstanding longitudinal marginal flange 83 and an upstanding longitudinal marginal flange 84, as well as a central longitudinal upstanding flange 85, all said flanges 81, 82, 83, 84 and 85 being undercut, as shown at 86 in FIG. 8. All of the flanges 84 of the platelike members 75 and 75' are in longitudinal alignment when said plate-like members are assembled to form a metallic body portion of a hearth section, as are also all of the flanges 83 and 85 except at the corner recesses 79.

Each of said plate-like members also has a downwardly offset wall portion 87 along the marginal edge thereof that is provided with the marginal flange 84, and a lip or ledge 88 extending horizontally from the offset portion 87 so that said ledge 88 is offset downwardly below the bottom wall of the section. It will also be noted that the flanges 76 and 77 have their end portions 89 at the ends thereof opposite those margins of the plate-like members that are provided with the ledges 88 inwardly offset an amount sufficiently to provide for the lip portions of one of the hearth sections to readily pass under the bottom wall of the body portion of the next adjacent hearth section. When the plate-like members 75 and 75' are assembled into a metallic body portion of a hearth section, the ledges or lips 88 thereon are all in longitudinal alignment with each other both vertically and horizontally except at the corner recesses of the section 72.

Mounted on each assembled metallic body portion of a hearth section is a monolithic refractory body 90, which is made either by casting or ramming and which extends throughout the length and width of the hearth section with the refractory material 90 extending a considerable distance above the tops of the flanges 81, 82, 83, 84 and 85 so as to protect the metallic flanges from the heat of the burning fuel that is on the hearth. Due to the undercut character of the flanges 81, 82, 83, 84 and 85, the refractory body portion 90 of the hearth section is firmly keyed to the metallic body portion of said section.

The hearth sections 72 and 74 are of a similar character, but the cut-out corner portions to form the corner recesses 79 are provided on the opposite marginal edge of the section 74 from that provided with such cut-out portions of the section 72, the cut-out or recessed portions 79 being along the margins of the body portion of section 72 that is provided with the lip or ledge 88 and, preferably, the inwardly offset edges at 79 are provided with similar lips 88, while the section 74 has the cut-outs at the corner portions along the longitudinal edge that has the upstanding flanges 83 thereon. The flanges 76 and 77 are interrupted at such a point on the body portion of the section 72 that the shaft 62 carrying the section 72 will be located on the one side of the center line of the section 72 and the interruptions in the flanges 76 and 77 of the sections 73 and 74 and shafts 63 and 64 will be located on the other side of the center lines of the sections 73 and 74. The shaft 62 is accordingly located so that the section 72 swings about an axis to the right of said center line as viewed in FIGS. 1 and 4 in order that the lip 88 on section 72 will clear the adjacent structure as the section 72 swings into dumping position and returns to fuel supporting position. As the sections 73 and 74 will be overweighted on the right side of their pivotal axes they will tend to swing clockwise about their pivotal axes, as viewed in FIG. 4, and after having moved to their fuel supporting position will be held by their own weight with the body portion of the section 74 in engagement with the lip 47 and the body portion of the section 73 in engagement with the lip 88 of section 74.

The refractory material 90 is recessed at the corners, as indicated at 91 in FIG. 3, at the recesses 79 in the metal body portions. When the three sections 72, 73 and 74 are arranged in the position in which they are in the furnace, which is the same as that shown in FIG. 3, the refractory top surface portions 90 of said sections will have their straight longitudinal edges 92 in adjacency, forming a substantially uninterrupted hearth when the sections 72, 73 and 74 are in a horizontal position, such as shown in full lines in FIG. 1, and 4 to 6 inclusive, and the dumping hearth will have parallel straight outer marginal edges 93 parallel to the pivotal axes of the sections extending between the cut out right angular corners 91 formed by the longitudinal marginal edges of the sections 72 and 74 that are remote from the middle section 73, and similar straight edges are formed, collectively, by the end marginal edges 94, 95 and 96 of the sections 73, 72 and 74.

The eccentric locations of the shafts 63 and 64 will overbalance the weight of the entire dumping hearth in the same direction as the sections 73 and 74 although the section 72 is overbalanced in the opposite direction, as all the sections are connected together to move as a unit by the operating connections to be described below. Accordingly, no holding force will be necessary to maintain the sections in their horizontal fuel supporting position.

The refractory body 30 is provided with straight parallel longitudinal marginal edges 97 that are located adjacent the edges 93 of the dumping hearth sections 72 and 74 and with parallel straight longitudinal marginal edges 98 that lie adjacent the marginal edges 94, 95 and 96 at the opposite ends of the dumping hearth sections. Said refractory member 30 is further provided with an inward rectangular offset 99 at each of the corners thereof between the marginal edges 97 and 98, which interfits with a recessed portion 91 at each of the corners of the dumping hearth. The member 30 thus forms a stationary refractory hearth portion that, together with the dumping sections 72, 73 and 74, forms a continuous bottom or hearth for the combustion chamber of the furnace.

It will be noted that when the parts are in the position shown in FIG. 4 the lip 88 on the section 72 will underlie the member 38 and the upwardly and inwardly inclined flange 39 will extend substantially parallel to the inwardly and upwardly inclined outer face of the flange 84 on the section 72 and that the lips 47 and 47' on the bar 45 will underlie the metal body portion of the section 74 below the upstanding flange 83 thereon. The lips or ledges 88 on the sections 73 and 74 extend under the plate-like body portions 75 of the sections 72 and 73. Thus the sections 72, 73 and 74 form a closure between the combustion chamber and the ash pit when in the horizontal fuel supporting position.

Each of the sections 72, 73 and 74 of said dumping hearth has a pair of substantially triangular plate-like members 100 secured rigidly to the flanges 76 and 77 thereof midway of the length of said sections by means of the pairs of headed fastening elements 101. Said plate-like members 100 are held in a predetermined spaced relationship by means of a bolt or similar fastening element 102 and a spacing sleeve 103. Said paired plates 100 thus form lever arms that are rigidly mounted on the metallic body portions of the sections 72, 73 and 74 in spaced relation to the pivotal axes of the shafts 62, 63 and 64 respectively.

A bar 104 is pivotally connected with all of said paired plate-like members 100 at the narrower ends thereof by means of the pivot members 105, and at one end thereof said bar 104 is pivotally connected with a piston rod 106, which is provided with a clevis 107 through which the pivot pin 108 extends that pivotally connects said piston rod with the bar 104. The piston rod 106 is mounted on the piston 109, which operates in the fluid pressure cylinder 110, to which suitable operating fluid under pressure is supplied at opposite ends thereof through the conduits 111 and 112. Suitable operating connections may be provided for supplying said fluid through either the conduit 111 or 112 and connecting the same alternately with the outside air or a suitable receptacle to permit exhaust of operating fluid from said cylinder therethrough, to cause the piston 109 to move back and forth in the cylinder 110 in a well known manner.

Mounted on the frame member 34 is a bracket 113, which is provided with a flange 114 to which a pair of depending bracket members 115 are secured by bolts passing through the flanges 114 and 116. The depending bracket members 115 are provided with pivot members 117 forming trunnions for pivotally mounting the cylinder 110 on the framework, a suitable ring-like bracket 118 being provided on the cylinder 110 to complete said pivot mounting. The piston rod 106 extends through an opening 119 in the refractory wall 11 and an aligning opening in the metallic outer sheathing 120. In order to prevent entrance of air around the piston rod to the ash pit, a sealing flange 121 is provided, which is pressed against the sheathing 120 by means of a compression coil spring 122. The refractory wall 11 is offset inwardly, as at 123, to close the upper portion of the wall 11 inwardly of the frame members 32 and 33 and to protect the said frame members from any heat that may develop in the ash pit. The walls 11 extending at right angles to the walls shown in FIGS. 1 and 4 are provided with similarly inwardly offset portions 123 as shown in FIG. 5.

When the piston 109 is at the left hand end of the cylinder 110 as viewed in FIG. 4, the parts are in the full line position shown in FIG. 4. Upon movement of the piston to the right hand end of the cylinder the piston rod 106 and bar 104 are moved to the right, to the dotted line position shown in FIG. 4, moving the hearth sections 72, 73 and 74 to the dotted line position shown. Thus all of the hearth sections are tilted in the same direction about their axes at the same time to dump the ash remaining thereon into the ash pit. Upon return of the piston 109 to the left hand end of the cylinder, the parts are moved back into the full line position shown in FIG. 4, whereupon a new load of fuel can be introduced into the combustion chamber and deposited on the dumping hearth.

In the operation of the furnace embodying my improved dumping refractory hearth, when it is found that the accumulation of ash on the hearth is such that it is desirable to dump the ashes and other debris that remain on the hearth, the hearth is dumped to discharge the ash and other material thereon into the ash pit. At this time the doors 18 of the ash pit are kept closed so that no cold outer air enters the ash pit. As soon as the dumping operation has been completed the hearth sections 72, 73 and 74 are returned to their horizontal fuel supporting position. The refractory members 90 of said hearth sections will be in a highly heated state at this time and discharge of fuel onto the same, introduced through the fuel feed opening 27, will ignite due to the radiant heat produced by said refractory members 90. After the hearth has been restored to its fuel supporting position and the new charge of fuel has been discharged thereon and ignited, the ashes can be removed in any suitable manner, through the clean-out doors 18, and after removal of the ashes, the ash pit clean-out doors 18 are again closed so that the air that has entered through the same and is then confined within the ash pit 17 will be gradually heated up by the heat passing through the hearth from the burning fuel mounted thereon. This will result in the air in the ash pit being highly heated by the time it is necessary to again dump the hearth. As a result, the combustion chamber will not receive any relatively cold air into or through the same at any time.

What I claim is:

1. In a furnace, a dumping hearth comprising a plurality of hearth sections and means for mounting said sections to pivot about parallel axes comprising fixed bearings, shafts mounted in said bearings to rotate about said axes, cooperating means on said shafts and sections connecting said sections with said shafts to move therewith about said axes, stop means limiting pivotal movement of said sections about said axes in a predetermined direction, one of said sections being mounted with its center line offset from its pivotal axis in one direction and a plurality of said sections being mounted with their center lines offset from their pivotal axes in the opposite direction to overbalance said last mentioned sections to urge said sections to move about their axes in said predetermined direction, lever arms extending rigidly from said sections in spaced relation to said shafts, a reciprocable member pivotally connected with the ends of said arms remote from said sections, a cylinder, a piston operating therein, a piston rod extending from said piston and pivotally connected with said reciprocable member, and means for supplying fluid under pressure to opposite ends of said cylinder.

2. A hearth section comprising a plurality of metallic members having depending marginal transverse flanges thereon, means securing said flanges together face to face to secure said metallic members together to form a metallic body portion, each of said metallic members having upstanding undercut marginal flanges thereon, and a refractory body mounted on said metallic body portion and engaging said undercut flanges, said refractory body extending above said flanges and being coextensive with said metallic body portion.

3. In a furnace, a dumping hearth comprising a plurality of hearth sections and means for mounting said sections to pivot about parallel axes, the mounting for each of said sections comprising frame members at opposite ends of said sections, a transverse central frame member in downwardly spaced relation to said hearth, upstanding brackets on said frame member, a shaft, end bearings for said shaft mounted on said end frame members and center bearings for said shaft mounted on the upper ends of said brackets, said shaft rotating about its axis in said bearings, cooperating means on said shafts and sections detachably mounting each of said sections on one of said shafts to move with said shaft about its axis, lever arms extending rigidly from said sections in transversely spaced relation to said shafts, a reciprocable member pivotally connected with the ends of said arms remote from said sections, and means for moving said reciprocable member lengthwise of itself in either direction, said cooperating means comprising a pair of parallel flat bars on each of said shafts mounted in fixed position on opposite sides of their axes and depending transverse flanges on each of said sections having flat parallel end edges spaced to receive said flat surfaces on said shaft therebetween.

4. In a furnace, refractory walls forming a vertically elongated combustion chamber and an ash pit vertically aligned with and extending under the major portion of said combustion chamber, a refractory hearth extending between said walls at the bottom of said combustion chamber comprising a plurality of horizontally adjacent hearth sections extending between said combustion chamber and said ash pit, means for supplying air to said combustion chamber above said hearth, means for closing said ash pit against entrance of air below said hearth, each of said hearth sections having an imperforate metallic body portion comprising an imperforate bottom plate, a downwardly offset lip projecting laterally from said body portion and means extending downwardly from said bottom plate to mount said metallic body portion to pivot about an axis located below said bottom plate in said ash pit, an imperforate refractory body portion mounted on top of said bottom plate and co-extensive therewith and means for simultaneously swinging said sections about said axes between a fuel supporting position and a dumping position, said bottom plates of said sections overlapping said lips on adjacent sections in their fuel supporting position to form an imperforate closure between said combustion chamber and said ash pit constituting the closed bottom wall of said combustion chamber and the top wall of said ash pit.

References Cited by the Examiner
UNITED STATES PATENTS

| | | | |
|---|---|---|---|
| 465,006 | 12/1891 | Walker | 266—25 X |
| 949,065 | 2/1910 | Fowler | 126—177 |
| 959,106 | 5/1910 | Battle | 110—168 |
| 1,167,028 | 1/1916 | Stevens | 110—39 |
| 1,946,125 | 2/1934 | Bennett | 110—1 |
| 1,993,819 | 3/1935 | Beers | 110—39 |
| 2,249,410 | 7/1941 | Wilson. | |
| 2,258,280 | 10/1941 | Decker | 126—180 |
| 2,498,787 | 2/1950 | Bowsman | 126—162 X |
| 2,777,406 | 1/1957 | Turner et al. | 126—176 X |
| 2,796,198 | 6/1957 | Weigel et al. | 110—7 X |
| 2,933,057 | 4/1960 | Wilson | 110—7 |
| 3,026,826 | 3/1962 | Sampson | 110—7 |

FOREIGN PATENTS 261,587    12/1928    Italy.

FREDERICK L. MATTESON, Jr., *Primary Examiner.*

PERCY L. PATRICK, JAMES W. WESTHAVER,
*Examiners.*